Sept. 19, 1944.  J. H. HIRSCH ET AL  2,358,509
FILTRATION AND RECLAMATION OF CRACKING CATALYSTS
Filed May 9, 1941  2 Sheets-Sheet 2
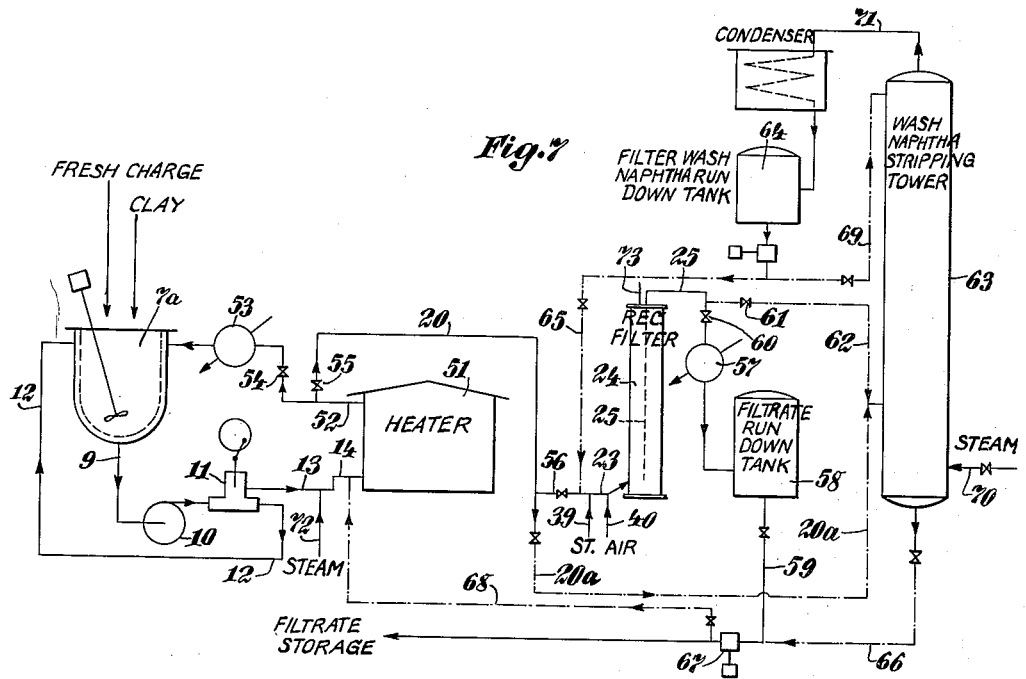
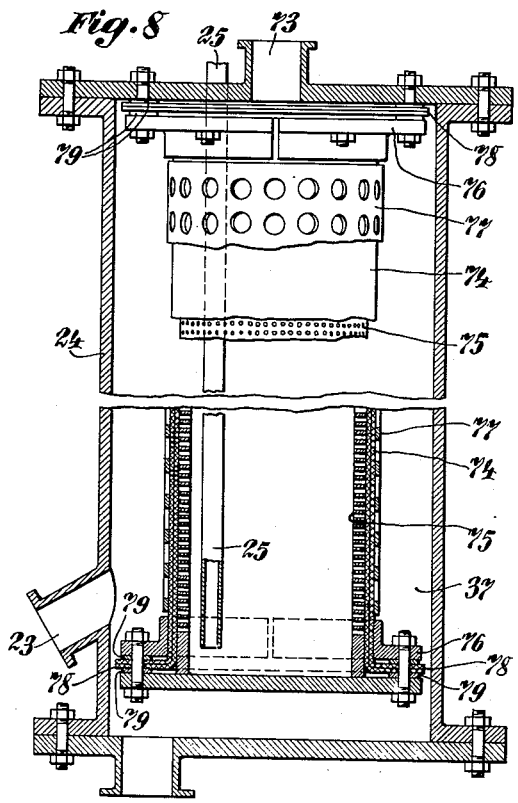
Joel H. Hirsch and
Frank L. Herle,
INVENTORS
BY
ATTORNEY.

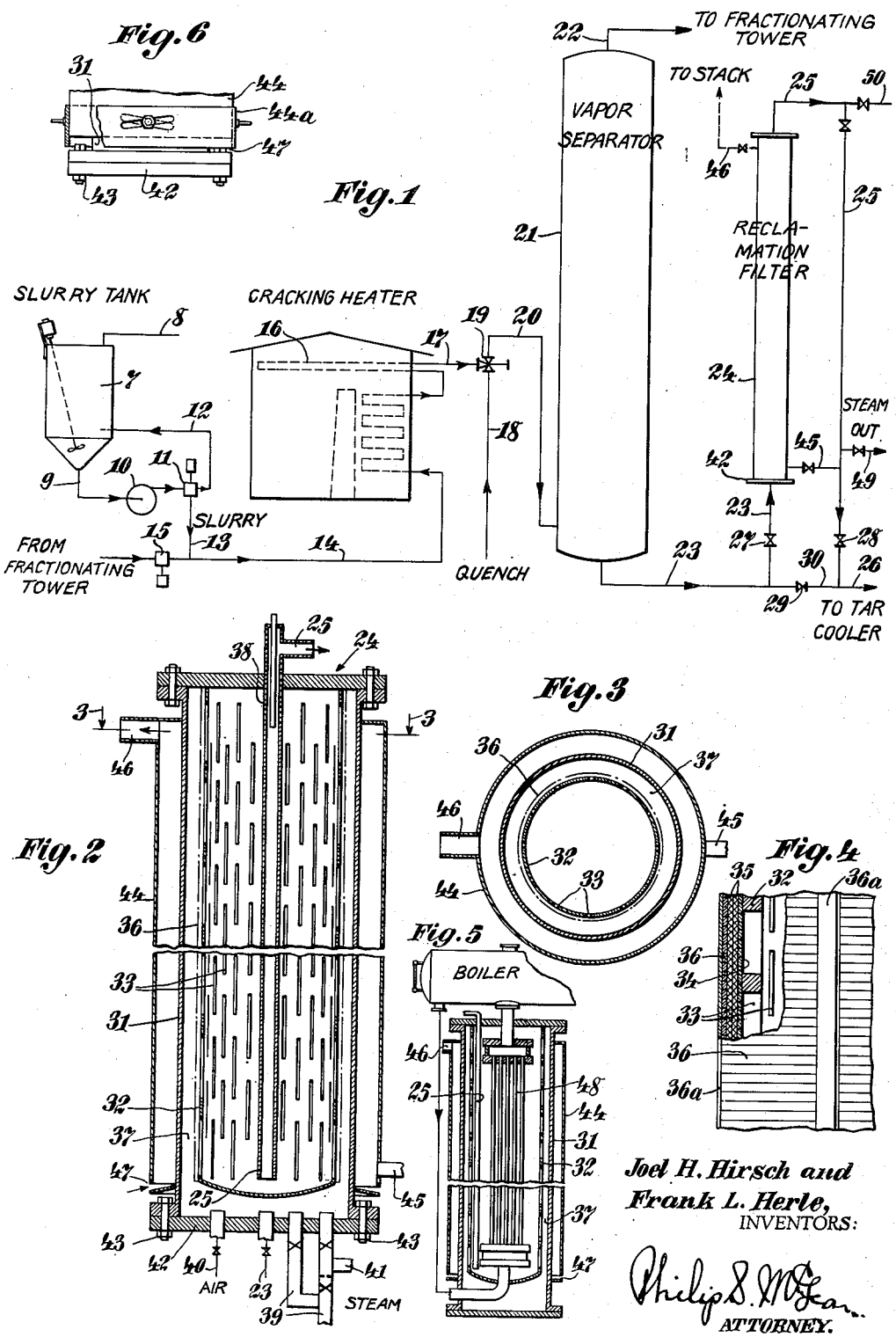

Patented Sept. 19, 1944

2,358,509

UNITED STATES PATENT OFFICE 2,358,509

FILTRATION AND RECLAMATION OF CRACKING CATALYSTS

Joel H. Hirsch and Frank L. Herle, Wichita, Kans., assignors to The Vickers Petroleum Co., Inc., Wichita, Kans., a corporation of Kansas Application May 9, 1941, Serial No. 392,708

11 Claims. (Cl. 210—150.6)

The invention here disclosed relates to catalytic cracking operations of the type covered in copending Joel H. Hirsch application Ser. No. 374,317 filed January 14, 1941, and maturing in Patent No. 2,313,940 dated March 16, 1943, in which the spent finely divided solid catalyst is removed, with a heavier fraction, from the cracking zone, separated from such carrier fraction in a special heat resistant filter and then regenerated by steaming and burning, in the filter, ready for return to the system.

Special objects of the present invention are to provide a practical and efficient construction for carrying out the catalyst filtering and regeneration operations, to provide effective control of temperature conditions for such filtering and regenerating operations and to accomplish these and other results with desirable economy, simplicity and the like.

Further objects and the novel features of invention by which all objects are attained will appear in the course of the following specification.

The drawings accompanying and forming part of the specification illustrate certain practical commercial embodiments of the invention. The structure and mode of operation however, may be modified and changed as regards this disclosure, all within the true spirit and broad scope of the invention, as hereinafter defined and broadly covered in the claims.

Fig. 1 is a flow sheet diagram illustrating one embodiment and use of the invention.

Fig. 2 is a broken sectional view of the reclamation filter shown in Fig. 1, on an enlarged scale.

Fig. 3 is a cross-sectional view on substantially the plane of line 3—3 of Fig. 2.

Fig. 4 is an enlarged broken sectional detail of the filter wrapping.

Fig. 5 is a broken sectional detail of a modified form of the filter.

Fig. 6 is a broken part sectional detail of a form of control damper for the filter jacket.

Fig. 7 is a flow diagram illustrating the invention applied to a system of contact filtration of lubricating oils.

Fig. 8 is a broken sectional view of an embodiment of reclamation filter used in such system.

In the flow diagram, Fig. 1, a slurry of the catalyst is made up at the slurry tank 7, for example, from reactivated catalyst from the reclamation filter and fresh charge or cycle stock furnished through a supply line 8. The powdered clay or other catalyst and make-up oil may be supplied at more or less constant rates to match a constant rate at which the slurry may be withdrawn and charged to the cracking zone.

The slurry is shown as withdrawn from the mixing tank at 9, and passed by a centrifugal pump 10, to the suction inlet of a triplex charging pump 11, having a return connection 12, to the mixing tank and a pressure discharge line 13, meeting the charging line 14.

A pump 15, takes the charge stock from an accumulator, fractionating tower or other supply source and forces it after mixture with the slurry at 13, by line 14, through the cracking coil 16.

The cracked oil carrying the powdered catalyst passes out of the heater at 17, and after quenching at 18, passes through a pressure reducing valve 19, and line 20, into a vapor separator 21.

The overhead from the separator, in the illustration, is passed off by a line 22, to a fractionating tower and the condensed fraction, carrying with it the spent catalyst, is passed off from the bottom of the separator through line 23, into the bottom of the reclamation filter.

The catalyst is collected in filter 24, and the filtrate, taken off at the top is passed through line 25—26, to a tar cooler.

During the filtration step described, valves 27, 28, in lines 23 and 25, will be open and valve 29, connecting these lines at 30, will be closed.

The filter is shown in Fig. 2 as consisting of an outer shell or casing 31, and an inner shell 32, slotted at 33, and covered with a suitable heat resistant filter wrapping.

In Fig. 4, the filter wrapping is shown as made up of an inner layer 34, of square section wire, welded to the slotted shell, two superposed layers of asbestos filter cloth 35, and an outer layer of square cross-section steel wire 36, held in place by longitudinal straps 36a, welded to it.

Preferably, the inner filter element 32, is kept as small in diameter as practicable, consistent with satisfactory regeneration of the catalyst, in order to provide the maximum annular collecting space at 37, between the inner and outer shells.

A thermocouple well is indicated at 38, in the outlet connection at 25, at the top and suitable steam and air inlets are provided at the bottom.

In the illustration, a steam connection is indicated at 39, an air supply connection at 40, and a steam operated air injector at 41, these being suitably valved so that they may be controlled as necessary.

The bottom 42, of the outer shell or filter casing is shown removably secured at 43, so that catalyst collected in the annular chamber 37, may be readily discharged after reactivation.

The outer shell of the filter is shown enclosed in a jacket 44, which in the present instance, may be utilized for heating, cooling or maintaining a particular temperature condition. When this jacket is closed or no circulation is provided through the same, a dead air space is afforded which has the effect of insulating the filter. At such time, the jacket serves for what would be a more expensive method of insulating the filter. If heat is required, steam and combustion gases may be passed through the jacket as by a connection 45, at the bottom, from filter outlet 25, and a discharge connection 46, at the top to a stack or waste heat utilizing device.

When cooling is required, air may be admitted at the bottom at 47, and admission of such cooling air may be regulated and, if desirable, fully cut off, as by means of a suitable damper 44a, at such inlet, as shown in Fig. 6.

For further heat extraction purposes, boiler tubes may be extended longitudinally through the filter element, substantially as indicated at 48, in Fig. 5, and these may be capable of generating all the steam required for the reclamation process. This steam of regeneration may be used in the air injector for furnishing the combustion air. Some additional air however, may be required from the plant supply during that portion of the reclamation cycle in which both steam and air are admitted and during the latter part of the cycle when steam is cut off and air alone is admitted to the filter.

As a possible alternative, instead of generating steam, high temperature heat removal media may be used in the boiler tubes, such as "Dowtherm," diphenyl or circulated gas oil. Such media permit recovering the heat of combustion at a higher temperature level, than would be possible with steam, at conventional steam pressures, should this be desirable.

In operation, after the filter has become full, as may conveniently be indicated by rise of pressure on a gage associated with the filter, such filter may be cut out of line and a fresh filter cut in in its place.

During the filling stage, the jacket may be utilized as a closed dead-air space insulator for holding the heat in such hot filtering operation.

In the steaming step, superheated steam may be admitted through line 39, the last traces of oil being recovered from the catalyst held in the filter during such operation and passing off at 25, 49, usually to a separator, where the water is removed.

After recovery of oil from the catalyst, air may be cut in through the steam operated air injector 41, to burn the carbonaceous matter out of the catalyst. If heating of the filter is desired or required during the steaming operation and the dead air space does not hold the heat sufficiently, steam and combustion gases may be passed through the jacket by way of connections 45 and 46.

The proportions of air and steam are usually regulated to keep the temperature down to about 900° F. during the burning stage, this temperature being low enough to avoid fusing of the catalyst. The relatively narrow annular space afforded between the inner and outer shells promotes intimate contact between the catalyst particles and the steam and air for combustion and proper regulation of the jacket enables desirable control of the heat removal during the burning operations. The stack effect materially aids cooling in such stages of operation where heat removal is desirable.

The boiler tubes such as illustrated in Fig. 5, provide desired heat extraction and also, when so arranged, for generation of the steam required during the reclamation stage.

As the temperature rise begins to fall off, the proportion of air may be increased until finally all the steam is cut off and only pure air is being admitted to the filter. The burning operation may then be continued with admission of air alone until the temperature has fallen to below 800° F., indicating that all the carbonaceous material has been burned off the catalyst.

During the burning stage, the combustion products may be passed off at 25, 50, Fig. 1, to a stack or to some form of waste heat recovery system.

At the end of the burning operation, the various connections may be shut off and the regenerated catalyst dumped, as by dropping the bottom of the filter or otherwise, the connections to the bottom being such as to permit this.

After dumping, the reactivated catalyst may be charged back direct to the slurry tank, or be stored or otherwise disposed of.

The complete process involving cracking, filtering, reclaiming and returning reactivated catalyst to the system may be carried out as a continuous operation by using two or more filters and steaming, burning and dumping one filter, while the filter in service is filling. This provision of two or more filters and the carrying out at the same time of these different operations in different filters, provides possibilities of further desirable controls, as by taking the heat generated by the burning in one filter and transferring that over to another filter, for instance, one that is filling, where additional heat may be required.

The special filter wrapping made up of layers of asbestos filter cloth between layers of wire, on the slotted filter shell, is mechanically strong enough to withstand the pressure as well as the temperatures of the hot filtering, steaming and burning operations.

The jacket construction is less expensive than covering the filter with insulation and has the important advantage of enabling heat extraction or cooling as well as the possibility of conserving or building up heat in the filter.

The reclamation filter disclosed is adapted to the handling of different catalysts. The treated adsorbent clay powder known as "Super Filtrol" has been found satisfactory for the operations described.

Fig. 7 is a flow diagram of a unit for processing lubricating oil fractions from Pennsylvania crude and providing for contact clay treating, removal of clay from the oil by hot filtration and regeneration of clay in the filter.

The oil to be treated and contact clay, such as "Super Filtrol" are mixed in a steam jacketed kettle 7a and after thorough mixture, the slurry is withdrawn by centrifugal pump 10 and circulated through the suction of triplex pump 11. The triplex pump takes out of the stream a predetermined desired amount for processing and returns the remainder to the mixing kettle through the line 12. The centrifugal pump circulates many times the quantity of slurry handled by the triplex pump and by this rapid circulation, prevents settling of the clay in transit.

The triplex pump charges the removed portion, at substantially constant rate, by connections 13, 14, to the heater 51, return line 52, and cooler 53, back to the mixing kettle.

For proper treatment of the oil, particularly high boiling lubricating fractions, a fairly long contact time at elevated temperature is required. For some stocks, a contact period of as long as twenty minutes at a temperature of 550° F. is necessary.

By repeated circulation through the heater as described, the required time and temperature conditions are accomplished and these conditions can be obtained to meet the particular requirements of the oil being processed by adjustment of the charge rate from the triplex pump and the temperature maintained in the heater. Since the mixing kettle is an open vessel, the cooler 53, is employed in the circuit to cool the effluent from the heater sufficiently to prevent oxidation of the oil.

When sufficient contacting of the oil and clay has been effected, the valve 54, in the return line to the kettle is closed and valves 55, 56, to the reclamation filter 24, are opened. In the filter, the clay is retained in the annular filter space 37, between the outer and inner shells and the treated decolorized filtrate passing through the filter element flows out by way of the discharge line 25, through a cooler 57, and filtrate run down tank 58, and line 59, to storage.

A particularly important feature of the present invention follows from the fact that the filter construction permits filtration at elevated temperatures, where the reduced viscosity of the oil makes possible high rates of filtration without addition of a diluent viscosity cutting oil, such as required in conventional filtration processes. In conventional methods, the design and structural materials of the filter press and filter cloth usually restrict the filtration to relatively low temperatures, where the oil under treatment is so viscous as to require addition of large proportions of a light oil such as naphtha to cut the viscosity sufficiently to permit commercially feasible rates of filtration and which naphtha must subsequently be removed by fractional distillation at additional overall operating expenses. All these additional costs are avoided in the present hot filtration process.

When the filter is filled with spent clay, the valve 60, in the connections to the cooler and filtrate run-down tank is closed and valve 61, in the connections 62, to the wash naphtha stripping tower 63, is opened. Steam is then admitted through connections 39, to the filter to lower the temperature and strip some of the oil off the clay.

After the filter is sufficiently cooled, the last traces of oil are washed off the clay with filter wash naphtha from a rundown tank 64, through line 65, 23. After this washing with naphtha, the naphtha is steamed off to the tower through connections 25, 62, leaving only the carbonaceous color bodies on the clay and the filter then ready for the clay reclamation operation.

The wash naphtha and the filtrate washed off the clay, collect in the base of the stripping tower 63, during the washing operation. When the washing operation is completed, this solution is withdrawn through the bottom connection 66, and forced by pump 67, through connections 68, to the heater and from whence it is discharged through connections 20, and 20a, into the tower 63, where a small amount of steam is admitted at 70, to aid the stripping operation.

In the tower 63, the naphtha is separated from the lubricating oil fractions by fractional distillation, using a bubble plate column and naphtha as overhead reflux. The recovered naphtha passes off at 71, to the naphtha rundown tank 64, ready for the next filter washing operation and the denuded recovered lubricating oil is withdrawn and pumped to storage at 66, 67.

The amount of naphtha used in the washing and denuding operations described is relatively small as compared with that required when naphtha is used for viscosity cutting as well as filter washing, as in the conventional methods of processing lubricating oils.

In the clay reclamation step, steam admitted at 72, is superheated in the heater and passing out through 20, 23, is mixed with air for combustion at 40, and admitted to the filter. The carbonaceous color bodies are burned off the clay in the annular space in the filter, the combustion gases and steam passing through the filter cloth and out at the top of the filter at 73, to a stack.

The relative proportions of air and steam and the temperature at which the air-steam mixture enters the filter are controlled to maintain a temperature on the order of 900° F., during the burning operation. This temperature is low enough to prevent fusing the clay and to insure retention of the adsorptive and decolorizing properties of the clay. The rate and extent of the burning operation may be determined by measuring the temperature in the filter and by analysis of the combustion gas leaving the filter and conditions be controlled accordingly.

The reclamation filter employed in the clay contacting system described may be constructed as indicated in Fig. 8, with two layers of asbestos filter cloth 74, wrapped in overlapping relation about a perforated cylindrical core 75, which is welded to the top head of the filter casing, said filter cloth being secured at the ends by split clamping rings 76, and protected by a perforated cover cylinder 77. By flanging the ends of the filter cloth outward beneath the clamping rings at 78, and securing the same with asbestos rope gaskets 79, between the metal and filter cloth, leakage is prevented and tearing of the cloth is avoided.

The filtrate discharge pipe 25, is preferably extended down near the bottom of the filter element as shown in Fig. 8, so that when the filter is filled with spent clay, the first steam admitted thereafter will force the filtrate remaining in the element up through this pipe and over into the filtrate rundown tank.

While the lubricating oil treating unit described is intended to operate on a batch basis, it will be clear that with proper engineering modifications, the process may be operated on a continuous basis, with attendant economies of heat consumption and the like.

The various features embodied in the several forms of reclamation filters illustrated may be used or combined in various ways to meet different special requirements and particularly to suit the needs of different catalytic cracking, oil decolorizing and other treating operations. Pumps, valves and other necessary accessories have been indicated but only in a general illustrative sense and it will be understood that necessary parts such as these will be employed where required.

What is claimed is:

1. A reclamation filter for catalyst employed in hydrocarbon cracking operations and comprising inner and outer filter shells providing between them an annular catalyst collecting chamber, the inner shell having passages therethrough, a covering of heat resistant filtering medium about said inner shell, means for admitting catalyst carrying fluid to said chamber and means for carrying off filtrate from said inner shell, steam and air supply connections to said chamber, controllable for furnishing steam and air required for burning catalyst collected in said chamber as a result of filtering operations, means for enabling removal of regenerated catalyst from said chamber and means controllable for retaining or for extracting heat from said filter during different stages of operation of the same, including an air jacket about said outer shell and means selectively operable for preventing or for enforcing circulation of air through said air jacket, said latter means including flow passages in said air jacket and valve mechanism adjustable for closing off or opening up air flow through the jacket.

2. A reclamation filter for catalyst employed in hydrocarbon cracking operations and comprising inner and outer filter shells providing between them an annular catalyst collecting chamber, the inner shell having passages therethrough, a covering of heat resistant filtering medium about said inner shell, means for admitting catalyst carrying fluid to said chamber and means for carrying off filtrate from said inner shell, steam and air supply connections to said chamber controllable for furnishing steam and air required for burning within said chamber catalyst collected in said chamber as a result of filtering operations, means for enabling removal of regenerated catalyst from said chamber, a jacket about said outer filter shell and controllable means for conducting gaseous combustion products of the catalyst regenerating operation from the interior of said filter through said surrounding jacket.

3. A reclamation filter for catalyst employed in hydrocarbon cracking operations and comprising inner and outer filter shells providing between them an annular catalyst collecting chamber, the inner shell having passages therethrough, a covering of heat resistant filtering medium about said inner shell, means for admitting catalyst carrying fluid to said chamber and means for carrying off filtrate from said inner shell, steam and air supply connections to said chamber controllable for furnishing steam and air required for burning catalyst collected in said chamber as a result of filtering operations, means for enabling removal of regenerated catalyst from said chamber, said covering including an inner wrapping of wire secured about the inner shell in closely wound filtering coils, one or more layers of asbestos filter cloth and an outer wrapping of closely wound filter coils of wire over said filter cloth.

4. A reclamation filter for cracking catalyst, comprising a slotted filter element, a wrapping of closely wound filtering coils of wire secured about said slotted filter element, one or more layers of asbestos filter cloth over said filter wire wrapping and a protective wrapping of similarly wound filter wire secured about said asbestos filter cloth and spaced from said slotted filter element and from said first wrapping of filter wire.

5. A filter element for catalyst reclamation filters, comprising a slotted shell, closely wound filter wrappings of wire about said shell and an interposed heat resistant filter cloth between said wrappings of wire, said wrappings of wire being in separate inner and outer layers spaced from each other by said interposed heat resistant filter cloth and with the outer layer spaced from the slotted shell by said inner layer and heat resistant filter cloth.

6. A reclamation filter comprising a heat resistant filtering unit having a catalyst collecting and burning chamber and a filtrate removing chamber, valved flow connections for passing catalyst carrying fluid into said filtering unit to effect filtering of the fluid and collection of catalyst in the catalyst collecting and burning chamber, valved connections for furnishing steam and air to said catalyst collecting and burning chamber for effecting burning of the catalyst collected in said chamber, a temperature control jacket about said filtering unit and valved circulation controlling means associated with said jacket for effecting retention of heat in or extraction of heat from said filtering unit in the different stages of operation of said filtering unit.

7. A reclamation filter for catalytic cracking operations, comprising inner and outer filter shells cooperatively providing a catalyst collecting chamber, the inner filter shell being slotted, a covering of heat resistant filter cloth about said slotted inner shell, flow admission and extraction connections to said outer and inner shells, including means controllable to at different times supply catalyst carrying oil, steam and air to the outer shell and to remove filtrate, oil steamed from the catalyst and combustion gases of regeneration from the inner shell, means enabling removal of regenerated catalyst from the outer shell, a jacket about the filter unit and controllable air and combustion gas connections to said jacket.

8. A reclamation filter comprising heat resistant filter structure defining a catalyst collecting and burning chamber and a filtrate removing chamber, connections for passing catalyst carrying fluid into said catalyst collecting and burning chamber and for removing filtrate from said filtrate removing chamber, valved connections for furnishing combustion supporting medium to said catalyst collecting and burning chamber for effecting burning of catalyst collected in said chamber, heat resistant tubing disposed within one of said chambers and subject to heat generated in the burning of said catalyst in said catalyst collecting and burning chamber and external connections with said tubing for effecting extraction of heat from said filter structure during burning of the catalyst therein.

9. A reclamation filter comprising heat resistant filter structure defining a catalyst collecting and burning chamber and a filtrate removing chamber, connections for passing catalyst carrying fluid into said catalyst collecting and burning chamber and for removing filtrate from said filtrate removing chamber, valved connections for furnishing combustion supporting medium to said catalyst collecting and burning chamber for effecting burning of catalyst collected in said chamber, heat resistant tubing disposed within one of said chambers and subject to heat generated in the burning of said catalyst in said catalyst collecting and burning chamber, said valved connections including air and steam furnishing connections and said steam connections being connected with said heat resistant tubing located within the filter structure for supplying the steam required in the burning operation from the heat generated within the filter during the burning of catalyst collected in the catalyst collecting and burning chamber.

10. A reclamation filter comprising heat resistant filter structure defining a catalyst collecting and burning chamber and a filtrate removing chamber, connections for passing catalyst carrying fluid into said catalyst collecting and burning chamber and for removing filtrate from said filtrate removing chamber, valved connections for furnishing combustion supporting medium to said catalyst collecting and burning chamber for effecting burning of catalyst collected in said chamber, heat resistant tubing disposed within one of said chambers and subject to heat generated in the burning of said catalyst in said catalyst collecting and burning chamber, said valved connections including an air injector arranged to deliver air into said catalyst collecting and burning chamber and connections from said fire resistant tubing for applying steam generated in said tubing to the operation of said air injector and to the supplying of steam into said catalyst collecting and burning chamber.

11. A reclamation filter comprising heat resistant filter structure defining a catalyst collecting and burning chamber and a filtrate removing chamber, connections for passing catalyst carrying fluid into said catalyst collecting and burning chamber and for removing filtrate from said filtrate removing chamber, valved connections for furnishing combustion supporting medium to said catalyst collecting and burning chamber for effecting burning of catalyst collected in said chamber, heat resistant tubing disposed within one of said chambers and subject to heat generated in the burning of said catalyst in said catalyst collecting and burning chamber and external connections with said tubing for effecting extraction of heat from said filter structure during burning of the catalyst therein, said two chambers of the filter structure being disposed one within the other and said tubing being disposed within the inner of said two chambers.

JOEL H. HIRSCH.
FRANK L. HERLE.